(12) United States Patent
Ward et al.

(10) Patent No.: US 9,113,639 B1
(45) Date of Patent: Aug. 25, 2015

(54) SCISSOR-STYLE CRAB LEG CLIPPING TOOL

(71) Applicants: Carol C. Ward, Winter Garden, FL (US); Chanika Rollins, Winter Garden, FL (US)

(72) Inventors: Carol C. Ward, Winter Garden, FL (US); Chanika Rollins, Winter Garden, FL (US)

( * ) Notice: Subject to any disclaimer, the term of this patent is extended or adjusted under 35 U.S.C. 154(b) by 0 days.

(21) Appl. No.: 14/590,516

(22) Filed: Jan. 6, 2015

(51) Int. Cl.
*A22C 29/02* (2006.01)

(52) U.S. Cl.
CPC ............. *A22C 29/027* (2013.01); *A22C 29/025* (2013.01)

(58) Field of Classification Search
USPC .................................... 452/1–6, 9, 11–13, 17
See application file for complete search history.

(56) References Cited

U.S. PATENT DOCUMENTS

| | | | |
|---|---|---|---|
| 1,219,857 A | 3/1917 | Pakkhttbst | |
| 2,434,550 A * | 1/1948 | Daniel | 43/53.5 |
| 3,395,421 A | 8/1968 | Harless, Jr. | |
| 4,519,136 A | 5/1985 | Walker | |
| 4,716,627 A * | 1/1988 | Scott, Jr. | 452/6 |
| 4,729,150 A * | 3/1988 | Breaux et al. | 452/105 |
| 6,019,673 A | 2/2000 | Saizon | |
| 6,129,622 A * | 10/2000 | Seaman et al. | 452/6 |
| 6,817,937 B1 * | 11/2004 | Merritt | 452/103 |
| 7,112,129 B2 * | 9/2006 | Zimbone et al. | 452/6 |
| 7,169,033 B1 * | 1/2007 | Colbert | 452/103 |
| 7,258,603 B1 * | 8/2007 | Martin | 452/6 |
| 7,481,700 B1 * | 1/2009 | Leboeuf, Jr. | 452/6 |
| D590,671 S | 4/2009 | Von Schoultz | |
| 7,621,803 B2 | 11/2009 | Martin | |

\* cited by examiner

*Primary Examiner* — Richard Price, Jr.
(74) *Attorney, Agent, or Firm* — Kyle A. Fletcher, Esq.

(57) ABSTRACT

The scissor-style crab leg clipping tool are uniquely designed to aid in cracking crab legs, cutting crab legs, and retrieving crab meat. The hand-held scissors feature elongated finger openings for enhanced gripping action. The pair of hand-held scissors is further defined with a first armature and a second armature. The first armature features an ovular profile along an anterior portion, whereas the second armature features a thin profile. The first armature includes a gripping nub at a distal end, and which extends downwardly as well as perpendicularly with respect to a first blade affixed thereon. The gripping nub is used to grab hold of crabmeat, and pull said crabmeat from within a crab leg shell.

14 Claims, 7 Drawing Sheets

SCISSOR-STYLE CRAB LEG CLIPPING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of scissors, more specifically, a pair of scissors that are uniquely designed to cut into crab legs.

SUMMARY OF THE INVENTION

An embodiment of the disclosure meets the needs presented above by generally comprising a pair of hand-held scissors that are uniquely modified to aid in cracking crab legs, cutting crab legs, and retrieving crab meat. The hand-held scissors feature elongated finger openings for enhanced gripping action. The pair of hand-held scissors is further defined with a first armature and a second armature. The first armature features an ovular profile along an anterior portion, whereas the second armature features a thin profile. The first armature includes a gripping nub at a distal end, and which extends downwardly as well as perpendicularly with respect to a first blade affixed thereon. The gripping nub is used to grab hold of crabmeat, and pull said crabmeat from within a crab leg shell. The first armature as well as the second armature each includes a series of cracking teeth, which are located between a pivot point and the elongated finger openings. The cracking teeth are used to crack the crab leg shell. The first blade of the first armature and a second blade of the second armature each include a hemi-ovular recess that is used to cut the crab leg shell whilst leaving the crab meat in tact there under.

These together with additional objects, features and advantages of the scissor-style crab leg clipping tool will be readily apparent to those of ordinary skill in the art upon reading the following detailed description of presently preferred, but nonetheless illustrative, embodiments of the scissor-style crab leg clipping tool when taken in conjunction with the accompanying drawings.

In this respect, before explaining the current embodiments of the scissor-style crab leg clipping tool in detail, it is to be understood that the scissor-style crab leg clipping tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the scissor-style crab leg clipping tool.

It is therefore important that the claims be regarded as including such equivalent construction insofar as they do not depart from the spirit and scope of the scissor-style crab leg clipping tool. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

Figure 1:
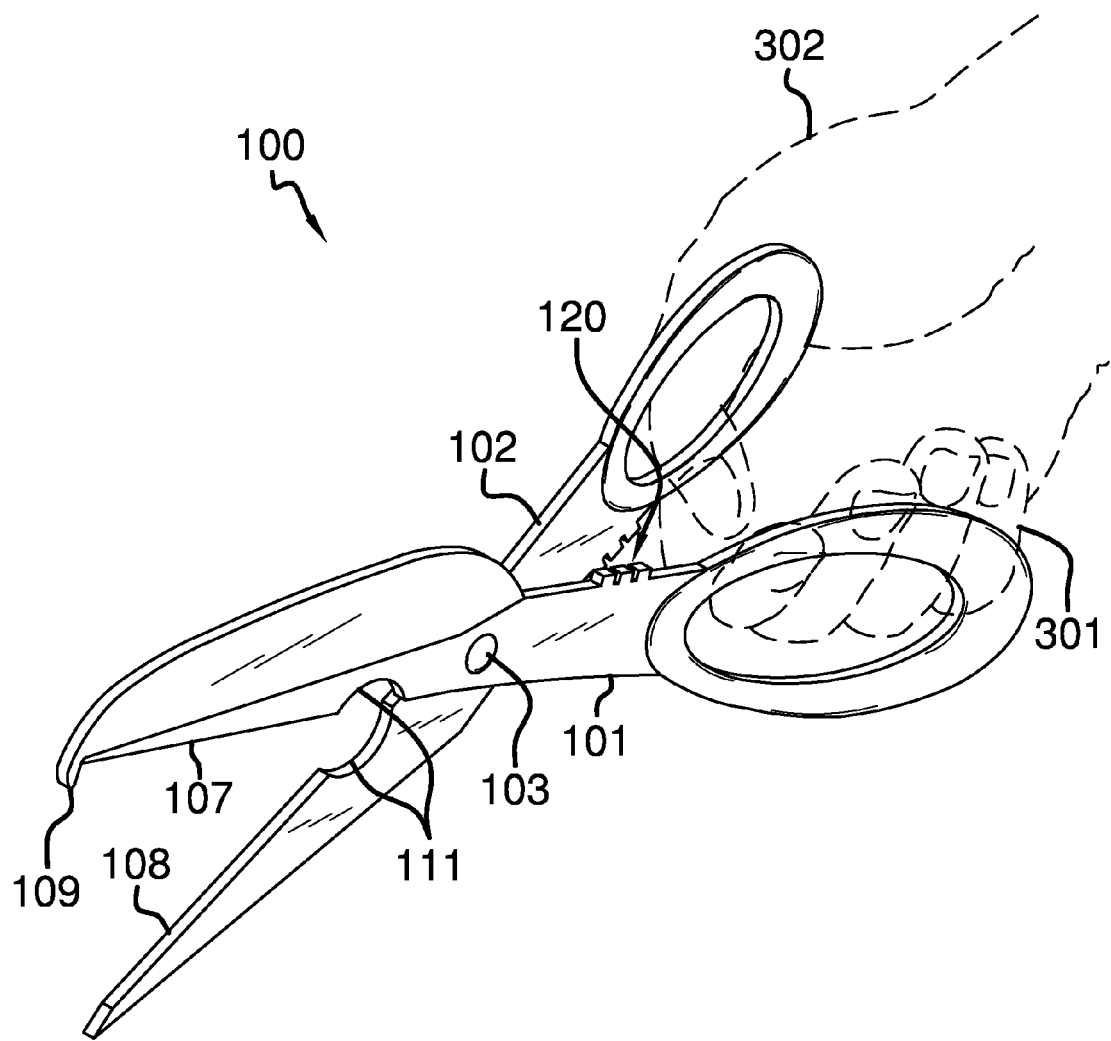
FIG. 1 is a first, perspective view of an embodiment of the disclosure.
Figure 2:
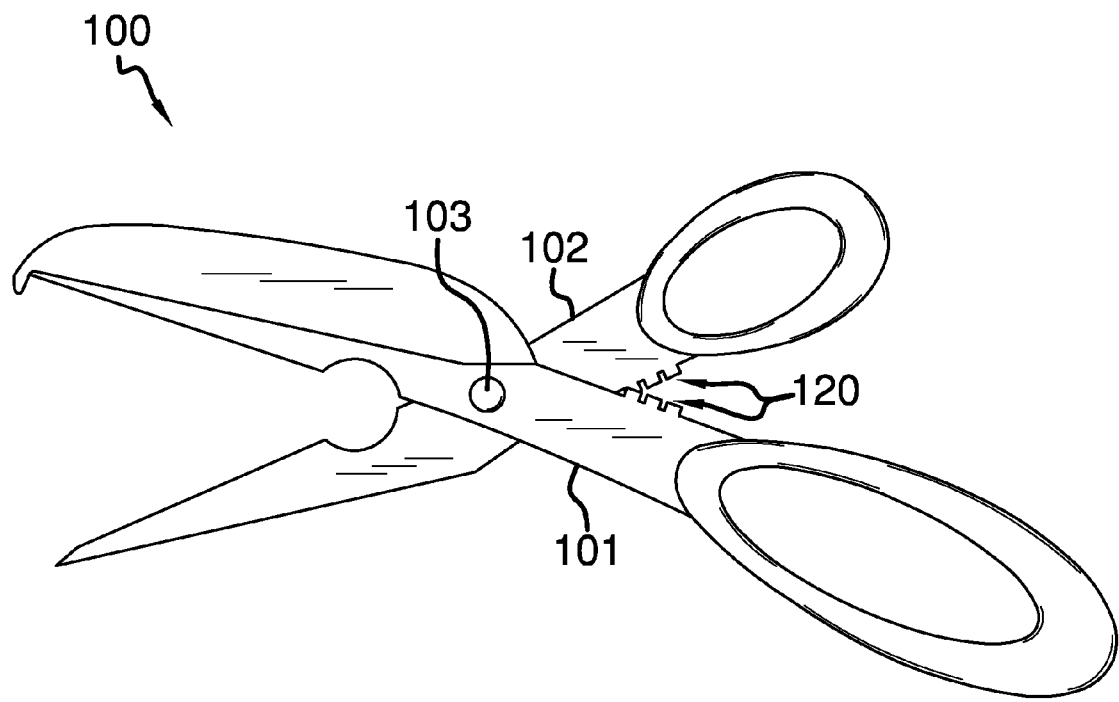
FIG. 2 is a front view of an embodiment of the disclosure.
Figure 3:
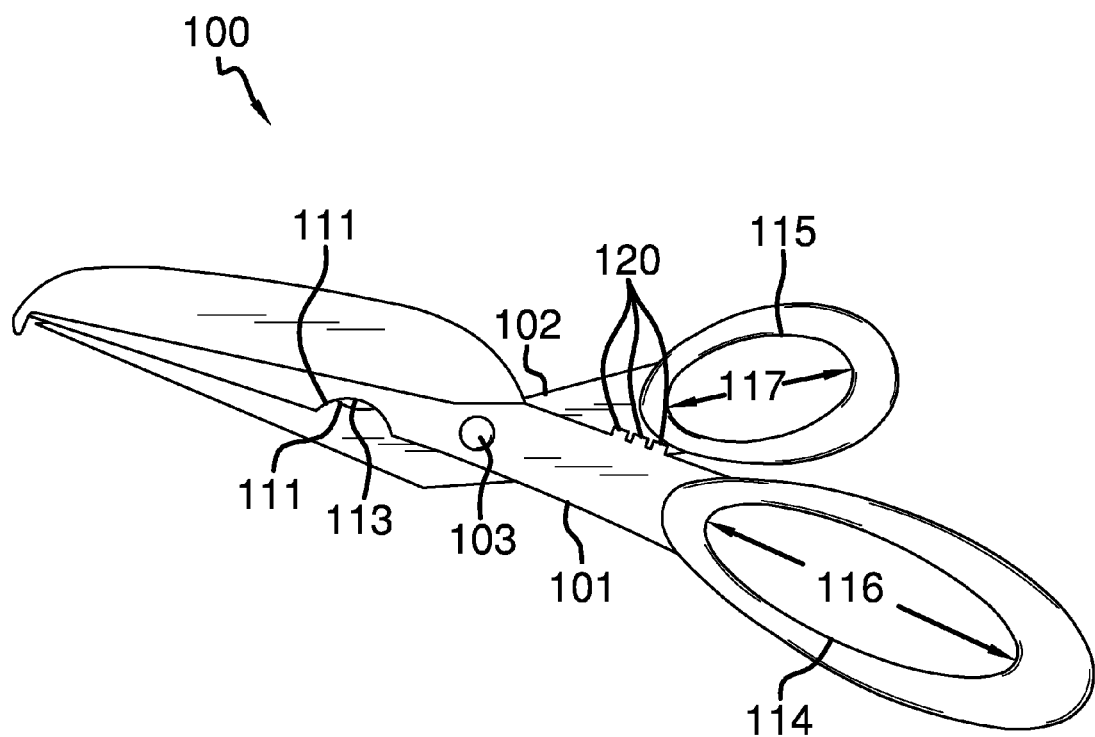
FIG. 3 is a front view of the embodiment in a closed orientation.
Figure 4:
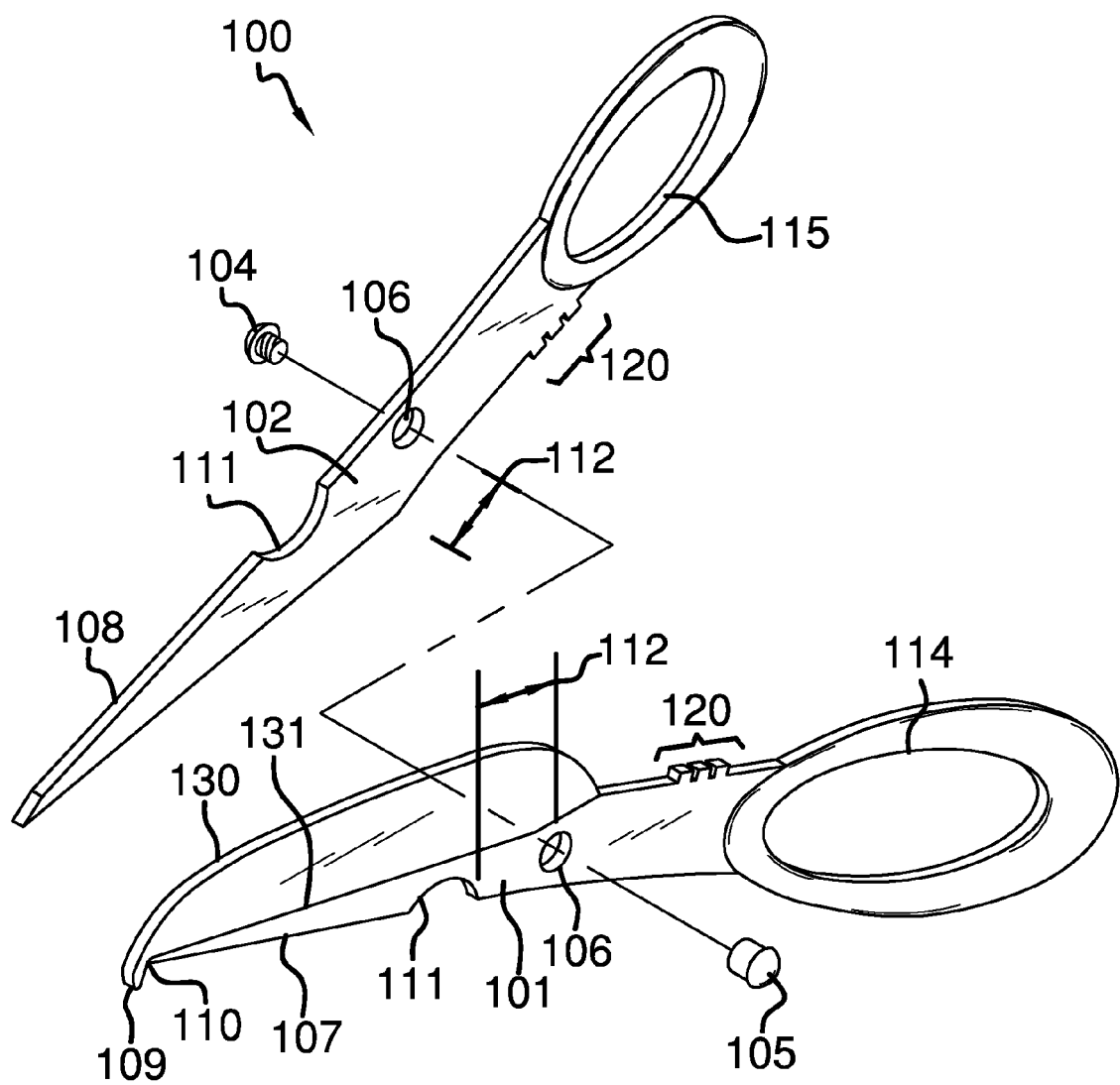
FIG. 4 is an exploded view of an embodiment of the disclosure.
Figure 5:
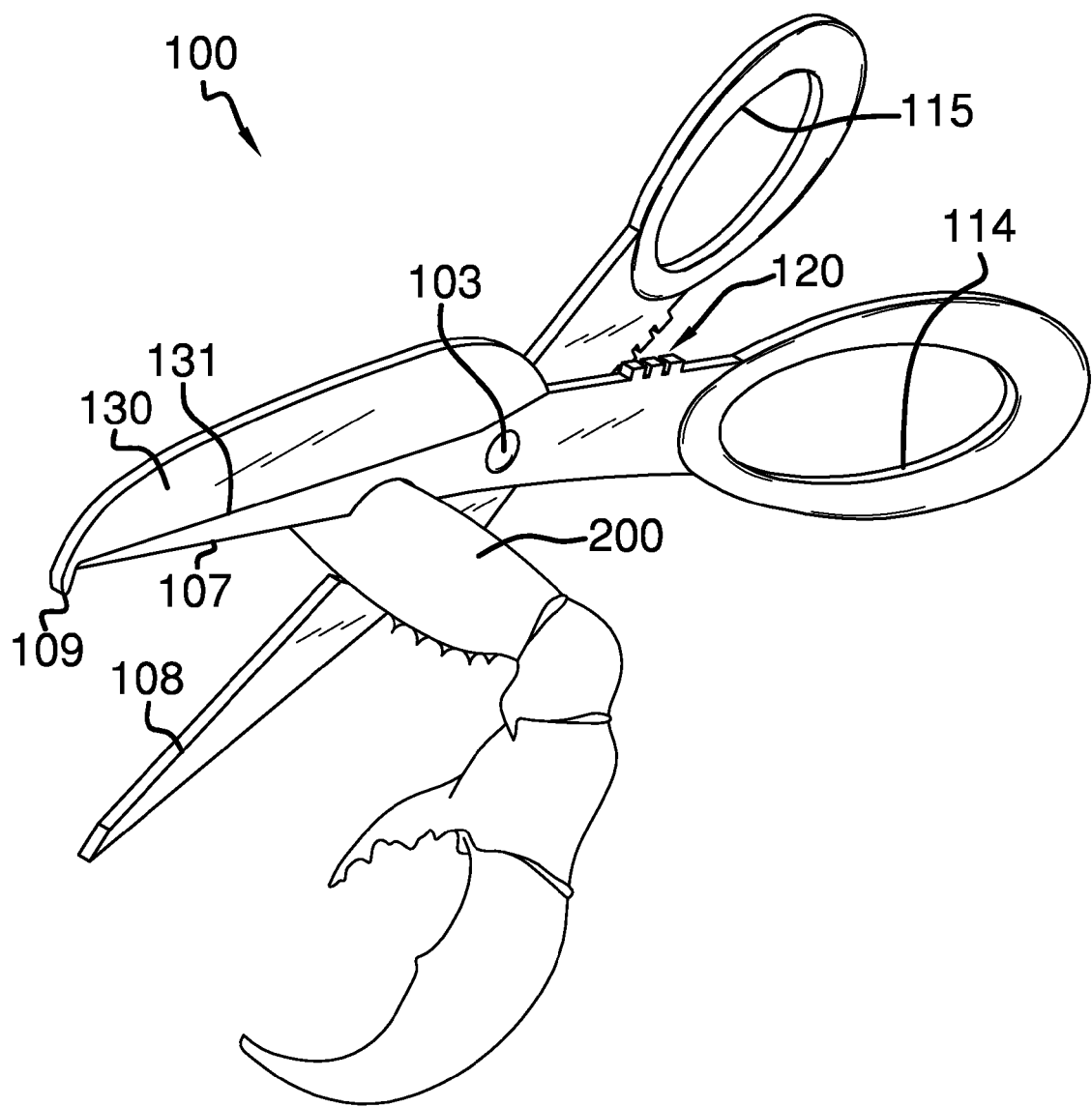
FIG. 5 is a second, perspective view of an embodiment in use.
Figure 6:
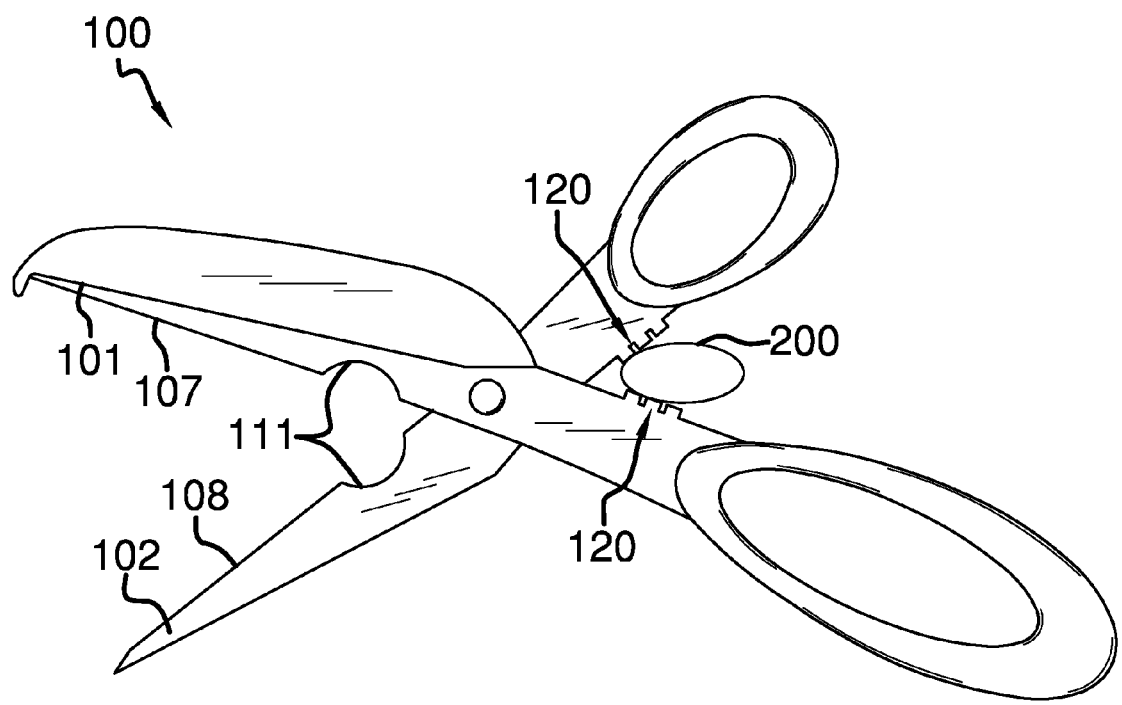
FIG. 6 is another front view of an embodiment of the disclosure in use.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the scissor-style crab leg clipping tool 100 (hereinafter invention) generally comprises a first armature 101 and a second armature 102. The first armature 101 attaches to and pivots with respect to the second armature 102 at a pivot point 103. The pivot point 103 involves the use of a screw member 104 and nut member 105 that attach through pivot point holes 106 provided on the first armature 101 and the second armature 102.

Figure 7:
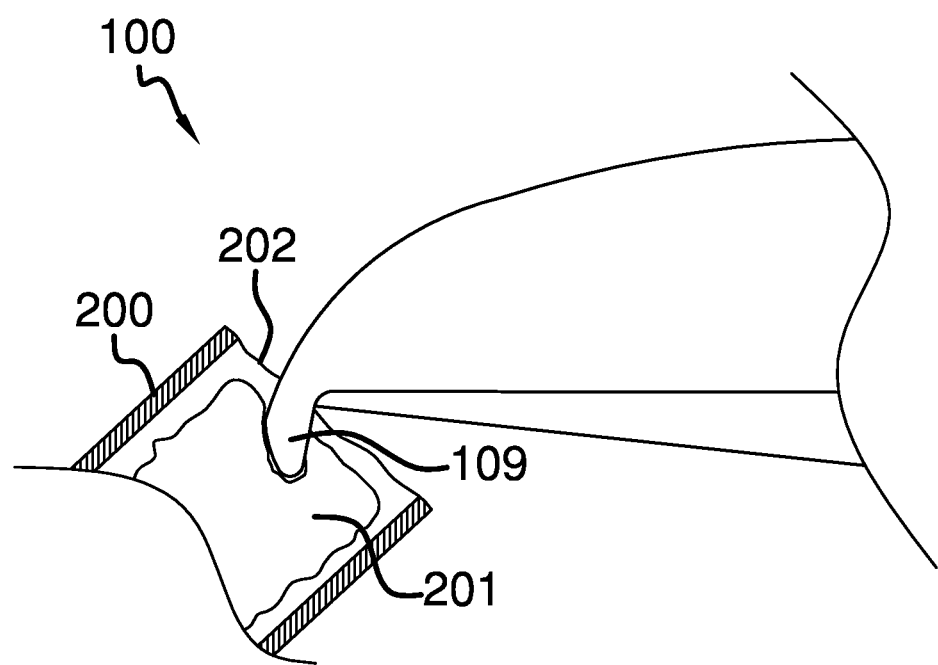
FIG. 7 is a detailed view of the gripping nub in use.

The first armature 101 is further defined with a first blade 107, whereas the second armature 102 includes a second blade 108. The first armature 101 is also further defined with a gripping nub 109 that is located at a first armature distal end 110. Referring to FIG. 7, the gripping nub 109 is configured to be used to rescue crabmeat 201 from a crab leg shell 200. Moreover, the gripping nub 109 is configured to be inserted into a crab leg shell opening 202 in order to grip and remove the crabmeat 201 from within.

The first blade 107 and the second blade 108 each include a hemi-ovular recess 111. The hemi-ovular recess is located a recess distance 112 from the pivot point 103. The hemi-ovular recess 111 of the first blade 107 and the second blade 108 is configured to be used to cut through the crab leg shell 200, but not the crabmeat 201 contained therein. In referencing FIG. 3, the first blade 107 and the second blade 108 being fully closed leave a slot 113 when the first armature 101 and the second armature 102 are fully closed against one another.

The first armature 101 includes a first elongated finger opening 114, and the second armature 102 includes a second elongated finger opening 115. The first elongated finger opening 114 is further defined with a first distance 116, which is at least twice as long as a second distance 117 of the second elongated finger opening 115. The first elongated finger opening 114 is configured to receive a plurality of fingers 301 whereas the second elongated finger opening 115 is configured to receive at least a thumb 302.

Both the first armature 101 and the second armature 102 include a series of cracking teeth 120. The cracking teeth 120 are located between the pivot point 103 and the first elongated finger opening 114 and the second elongated finger opening 115, respectively. Referencing FIG. 6, the cracking teeth 120 are configured to be used to crack a crab leg shell 200.

It shall be noted that the invention 100 is used to crack crab leg shells 200, cut crab leg shells 200, and retrieve crabmeat 201 from the crab leg shells 200. The first armature 101 features an ovular profile 130 along an anterior portion 131. The gripping nub 109 of the first armature 101 extends downwardly as well as perpendicularly with respect to the first blade 107.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A scissor-style crab leg clipping tool comprising:
a first armature and a second armature that pivot at a pivot point;
wherein the first armature includes a first blade whereas the second armature includes a second blade
wherein the first armature and the second armature each include a hemi-ovular recess that is configured to cut a crab leg shell, but not crabmeat contained therein; and
wherein the first armature includes a gripping nub at a first armature distal end, which is configured to be used to grab crabmeat from a crab leg shell opening;
wherein said scissor-style crab leg clipping tool is configured to be used to crack said crab leg shell, cut said crab leg shell, and retrieve crabmeat from within said crab leg shell;
wherein the gripping nub of the first armature extends downwardly as well as perpendicularly with respect to the first blade.

2. The scissor-style crab leg clipping tool according to claim 1, wherein the pivot point involves the use of a screw member and nut member that attach through pivot point holes provided on the first armature and the second armature.

3. The scissor-style crab leg clipping tool according to claim 2, wherein the first blade and the second blade being fully closed leave a slot when the first armature and the second armature are fully closed against one another; wherein said slot is the overlap of the hemi-ovular recess of the first blade of the first armature and the second blade of the second armature.

4. The scissor-style crab leg clipping tool according to claim 3, wherein the first armature includes a first elongated finger opening, and the second armature includes a second elongated finger opening.

5. The scissor-style crab leg clipping tool according to claim 4, wherein the first elongated finger opening is further defined with a first distance, which is at least twice as long as a second distance of the second elongated finger opening; wherein the first elongated finger opening is configured to receive a plurality of fingers whereas the second elongated finger opening is configured to receive at least a thumb.

6. The scissor-style crab leg clipping tool according to claim 5, wherein both the first armature and the second armature include a series of cracking teeth.

7. The scissor-style crab leg clipping tool according to claim 6, wherein the cracking teeth are located between the pivot point and the first elongated finger opening and the second elongated finger opening, respectively; wherein the cracking teeth are configured to be used to crack a crab leg shell.

8. The scissor-style crab leg clipping tool according to claim 7, wherein the first armature includes an ovular profile along an anterior portion.

9. A scissor-style crab leg clipping tool comprising:
a first armature and a second armature that pivot at a pivot point;
wherein the first armature includes a first blade whereas the second armature includes a second blade
wherein the first armature and the second armature each include a hemi-ovular recess that is configured to cut a crab leg shell, but not crabmeat contained therein; and
wherein the first armature includes a gripping nub at a first armature distal end, which is configured to be used to grab crabmeat from a crab leg shell opening;
wherein said scissor-style crab leg clipping tool is configured to be used to crack said crab leg shell, cut said crab leg shell, and retrieve crabmeat from within said crab leg shell;
wherein the first blade and the second blade being fully closed leave a slot when the first armature and the second armature are fully closed against one another;
wherein said slot is the overlap of the hemi-ovular recess of the first blade of the first armature and the second blade of the second armature;
wherein the first armature includes a first elongated finger opening, and the second armature includes a second elongated finger opening;
wherein the gripping nub of the first armature extends downwardly as well as perpendicularly with respect to the first blade.

10. The scissor-style crab leg clipping tool according to claim 9, wherein the pivot point involves the use of a screw member and nut member that attach through pivot point holes provided on the first armature and the second armature.

11. The scissor-style crab leg clipping tool according to claim 10, wherein the first elongated finger opening is further defined with a first distance, which is at least twice as long as a second distance of the second elongated finger opening; wherein the first elongated finger opening is configured to receive a plurality of fingers whereas the second elongated finger opening is configured to receive at least a thumb.

12. The scissor-style crab leg clipping tool according to claim 11, wherein both the first armature and the second armature include a series of cracking teeth.

13. The scissor-style crab leg clipping tool according to claim 12, wherein the cracking teeth are located between the pivot point and the first elongated finger opening and the second elongated finger opening, respectively; wherein the cracking teeth are configured to be used to crack a crab leg shell.

14. The scissor-style crab leg clipping tool according to claim 13, wherein the first armature includes an ovular profile along an anterior portion.

\* \* \* \* \*